(12) United States Patent
Loborg et al.

(10) Patent No.: US 8,909,208 B2
(45) Date of Patent: Dec. 9, 2014

(54) METHOD AND APPARATUS FOR MODE DRIVEN NODE MONITORING

(71) Applicant: Telefonaktiebolaget L M Ericsson, Stockholm (SE)

(72) Inventors: Peter Loborg, Linköping (SE); Stefan Engström, Linköping (SE); Lars Göran Gros, Linköping (SE); Fredrik Gunnarsson, Linköping (SE); Brendan Hassett, Galway (IE); Robert Petersen, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 56 days.

(21) Appl. No.: 13/643,744

(22) PCT Filed: Oct. 8, 2012

(86) PCT No.: PCT/SE2012/051074
§ 371 (c)(1),
(2), (4) Date: Oct. 26, 2012

(87) PCT Pub. No.: WO2013/066241
PCT Pub. Date: May 10, 2013

(65) Prior Publication Data
US 2014/0051416 A1  Feb. 20, 2014

Related U.S. Application Data

(60) Provisional application No. 61/555,692, filed on Nov. 4, 2011.

(51) Int. Cl.
*H04M 3/00* (2006.01)
*H04W 24/10* (2009.01)
*H04W 8/22* (2009.01)
*H04W 36/00* (2009.01)

(52) U.S. Cl.
CPC ............ *H04W 8/22* (2013.01); *H04W 36/0083* (2013.01); *H04W 24/10* (2013.01)
USPC ............ 455/418; 455/423; 455/445; 370/253

(58) Field of Classification Search
CPC ....... H04W 8/245; H04W 4/16; H04W 24/00; H04Q 11/0478; G06Q 30/02
USPC ............ 455/418, 423, 445; 370/253; 235/375
See application file for complete search history.

(56) References Cited

U.S. PATENT DOCUMENTS

2006/0150185 A1\* 7/2006 McKenney et al. ........... 718/102
2009/0049152 A1\* 2/2009 Rimhagen et al. ............ 709/209

(Continued)

FOREIGN PATENT DOCUMENTS

WO  WO 2009/022805 A1  2/2009
WO  WO 2009/072941 A1  6/2009
WO  WO 2011/095081 A1  8/2011

OTHER PUBLICATIONS

International Search Report issued in Application No. PCT.SE2012/051074 dated Jan. 18, 2013.

(Continued)

*Primary Examiner* — Danh Le
(74) *Attorney, Agent, or Firm* — Baker Botts, LLP

(57) ABSTRACT

Method and apparatus are provided to reduce the amount of performance indicator (PI) data to retrieve from a network node (28). The performance indicator (PI) data to be retrieved may depend on the reporting mode of the node, as well as the configured reporting scope of the current reporting mode. The set of available reporting modes may depend of the node type. Moreover, the current reporting mode may depend on the time of day, week, etc., the amount of served subscribers, traffic volume, etc., over a time window, whether a specific fault has occurred, etc.

23 Claims, 10 Drawing Sheets

(56) References Cited

U.S. PATENT DOCUMENTS

2010/0107182 A1* 4/2010 Daniel .................. 719/327
2010/0115081 A1* 5/2010 Janakiraman et al. ........ 709/223
2010/0217723 A1* 8/2010 Sauerwein et al. ........... 705/337
2011/0222432 A1* 9/2011 Westerberg et al. .......... 370/253
2011/0243072 A1* 10/2011 Omar ..................... 370/329

OTHER PUBLICATIONS

Written Opinion issued in Application No. PCT/SE2012/051074 dated Jan. 18, 2013.

* cited by examiner

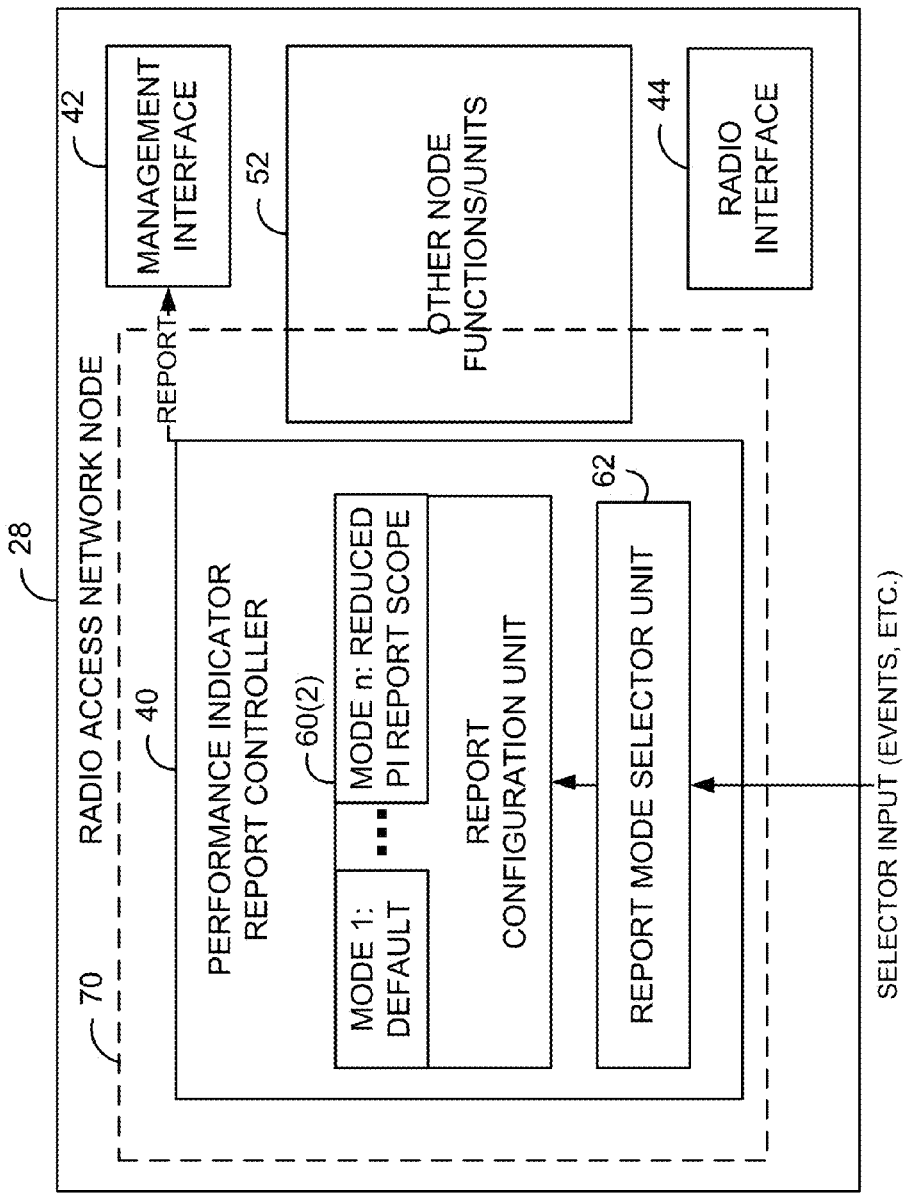

```
For ( CellRelation cr : CellRelation.getAllInstances() ) {
    cr.kpi_handover_sucess_rate =
        cr.pi_handover_prepare_sucesses/cr.pi_handover_prepare_attempts*
        cr.pi_handover_execute_sucesses/cr.pi_handover_execute_attempts;
}
...
```

METHOD AND APPARATUS FOR MODE DRIVEN NODE MONITORING

This application is the U.S. national phase of International Application No. PCT/SE2012/051074 filed 8 Oct. 2012 which designated the U.S. and claims priority to U.S. Provisional Application No. 61/555,692 filed 4 Nov. 2011, the entire contents of each of which are hereby incorporated by reference.

TECHNICAL FIELD

This invention pertains to telecommunications, and particularly to monitoring and reporting performance indicators of a network node.

BACKGROUND

In a typical cellular radio system, wireless terminals, also known as mobile stations and/or user equipments (UEs), communicate via a radio access network (RAN) to one or more core networks. The radio access network covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. Another identity identifying the cell uniquely in the whole mobile network is also broadcasted in the cell. The base stations communicate over the air interface operating on radio frequencies with the user equipment units (UE) within range of the base stations.

In some versions of the radio access network, several base stations are typically connected, e.g., by landlines or microwave, to a controller node, such as a radio network controller (RNC) or a base station controller (BSC), which supervises and coordinates various activities of the plural base stations connected thereto. The radio network controllers are typically connected to one or more core networks. The connection between nodes and networks is typically created using one or more transport networks.

The Universal Mobile Telecommunications System (UMTS) is a third generation mobile communication system, which evolved from the second generation (2G) Global System for Mobile Communications (GSM). The UMTS terrestrial radio access network (UTRAN) is essentially a radio access network using wideband code division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity. Specifications for the Evolved Packet System (EPS) have completed within the $3^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base station nodes are directly connected to the EPC core network rather than to radio network controller (RNC) nodes. In general, in E-UTRAN/LTE the functions of a radio network controller (RNC) node are distributed between the radio base stations nodes, e.g., eNodeBs in LTE, and the core network. As such, the radio access network (RAN) of an EPS system has an essentially "flat" architecture comprising radio base station nodes without reporting to radio network controller (RNC) nodes.

Carrier class telecommunication equipment is supervised via one or several monitoring functions. The two most basic methods for such supervision are fault management and performance management, the latter often standardized by organizations such as 3GPP to create a common method and principle for measuring the performance of a particular node type across different vendors.

The performance is characterized by using performance indicators (PI) —often called counters, counting events of a certain type on a certain device or part of the node, or counting amount of data of a certain type transported through a certain part or function of the node. An example of such a counter in an LTE radio base station ("RBS") is a counter that counts the number of successful attempts for a user equipment to attach to a radio cell. The performance indicators can be other than a counter, e.g., a performance indicator may be more complex. Examples of performance indicators also include histogram counters that can aggregate distributions, individual events, sets of events, fault information, aggregated fault information, etc.

The devices or functions that have associated counters are typically those parts that carry some form of payload. For a radio base station it is typically the radio cell or the node as a whole that has several counters defined. Also non-physical entities may have counters.

The prime example of a type of such virtual objects is the neighbor cell relation. The neighbor cell relation is a relation defined by a set of from-cell/to-cell descriptions. Each such description specifies that when the UE is served by a from-cell it should also monitor the signal strength of the to-cell, and the radio base station will use this information to evaluate which cell will provide best service for the UE. If the result of this evaluation is that the UE is best served by another than its current cell, the RBS will order the UE to switch serving cell—a process called hand-over. An important part of the radio service is to maintain the services while the UE is moving, and thus to successfully hand-over a UE to the most appropriate cell as the UE leaves the area for its currently serving cell. As a consequence it is important that the node is configured with the best possible neighbor cell relations, and depending on radio technology used the neighbor cell relations can refer to quite many neighbor cells for each cell on a node.

In order to evaluate the neighbor cell configuration of a node each from-cell/to-cell pair is equipped with a number of counters. Since there may be hundreds of such from-cell/to-cell pairs for each cell the amount of counter data produced by an LTE RBS will to a large portion (60-80%) consist of neighbor cell relation counter data.

The counter data is written to file at even periods for retrieval and post processing in a management system. One of the post processing operations done is to calculate Key Performance Indicators (KPI) based on the rather huge set of PI data retrieved from the node. The calculated KPIs, providing a condensed view of the nodes performance, are later aggregated over time to further reduce amount of data stored and to provide per hour, day, week or longer aggregated variants of these KPIs.

In the current solution all raw PI data is transported "as is" to a management system for several purposes:

Calculation of KPI values, where the results are stored as reports or new counter values Storage for later usage for . . .
  export to offline optimization and planning tools
  trouble shooting a dip in a KPI
  calculation of trends on selected PI values
  comparing trends before and after a configuration change has been applied to the network A significant amount of raw data is transported from every node in the radio network to the management system only to be used once for calculation of KPI data and then stored for a potential future usage. A majority of the PI data is never again used as the derived KPI data indicates that all is fine in the network.

With rapidly growing networks in terms of number of nodes and amount of PI data per node, the already severe problem of transporting and storing the PI data and calculating the KPI data becomes even worse.

SUMMARY

In some of its aspects the technology disclosed herein concerns apparatuses and methods to reduce the amount of performance indicator (PI) data to retrieve from a node. The PI data to be retrieved may depend on the reporting mode of the node, as well as the configured reporting scope of the current reporting mode. The set of available reporting modes may depend of the node type. Moreover, the current reporting mode may depend on the time of day, week etc, the amount of served subscribers, traffic volume etc over a time window, whether a specific fault has occurred, etc.

Furthermore, the configured reporting scope may contain essentially all available PIs, but may also contain a reduced set of PIs, PIs combined into key performance indicators (KPIs) at the node, aggregated PIs, only PIs related to a specific fault, event-triggered or periodic reporting of PIs. Raw PI data may still be generated in parallel for storage locally on the node or on file store equipment outside the node.

In one of its aspects the technology disclosed herein concerns a network node. The node comprises means for configuring the node with plural performance indicator data reporting modes and for making a selection of one of the plural modes as a current reporting mode and operating the node according to the current reporting mode.

In one of its aspects the technology disclosed herein concerns a network node comprising electronic circuitry arranged to configure the node with plural performance indicator data reporting modes and to make a selection of one of the plural modes as a current reporting mode and operating the node according to the current reporting mode. In an example implementation the electronic circuitry is arranged to configure the node with a set of plural performance indicator data reporting modes and to construct the set of modes in dependence upon a type of the node.

In another of its aspects the technology disclosed herein concerns a computer program product comprising coded instructions stored on non-transient media which, when executed by a processor, configure a network node, such as a node of a communications system, with plural performance indicator data reporting modes and make a selection of one of the plural modes as a current reporting mode for the node.

In another of its aspects the technology disclosed herein concerns a method of operating a network node. The method comprises configuring the node with plural performance indicator data reporting modes; and making a selection of one of the plural modes as a current reporting mode and operating the node according to the current reporting mode. In an example implementation the method comprises configuring the node with a set of plural performance indicator data reporting modes; and, constructing the set of modes in dependence upon a type of the node.

In another of its aspects the technology disclosed herein concerns a method of operating a telecommunications system. In an example mode the method comprises configuring a node of the communications system with plural performance indicator data reporting modes; and making a selection of one of the plural modes as a current reporting mode and operating the node according to the current reporting mode. In an example implementation the act of configuring the node may involve a management system.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 2-FIG. 5 are schematic views showing example alternate or combinable implementations of the radio access network node of FIG. 1A or the cellular network node of FIG. 1B.

DETAILED DESCRIPTION

Figure 1A:
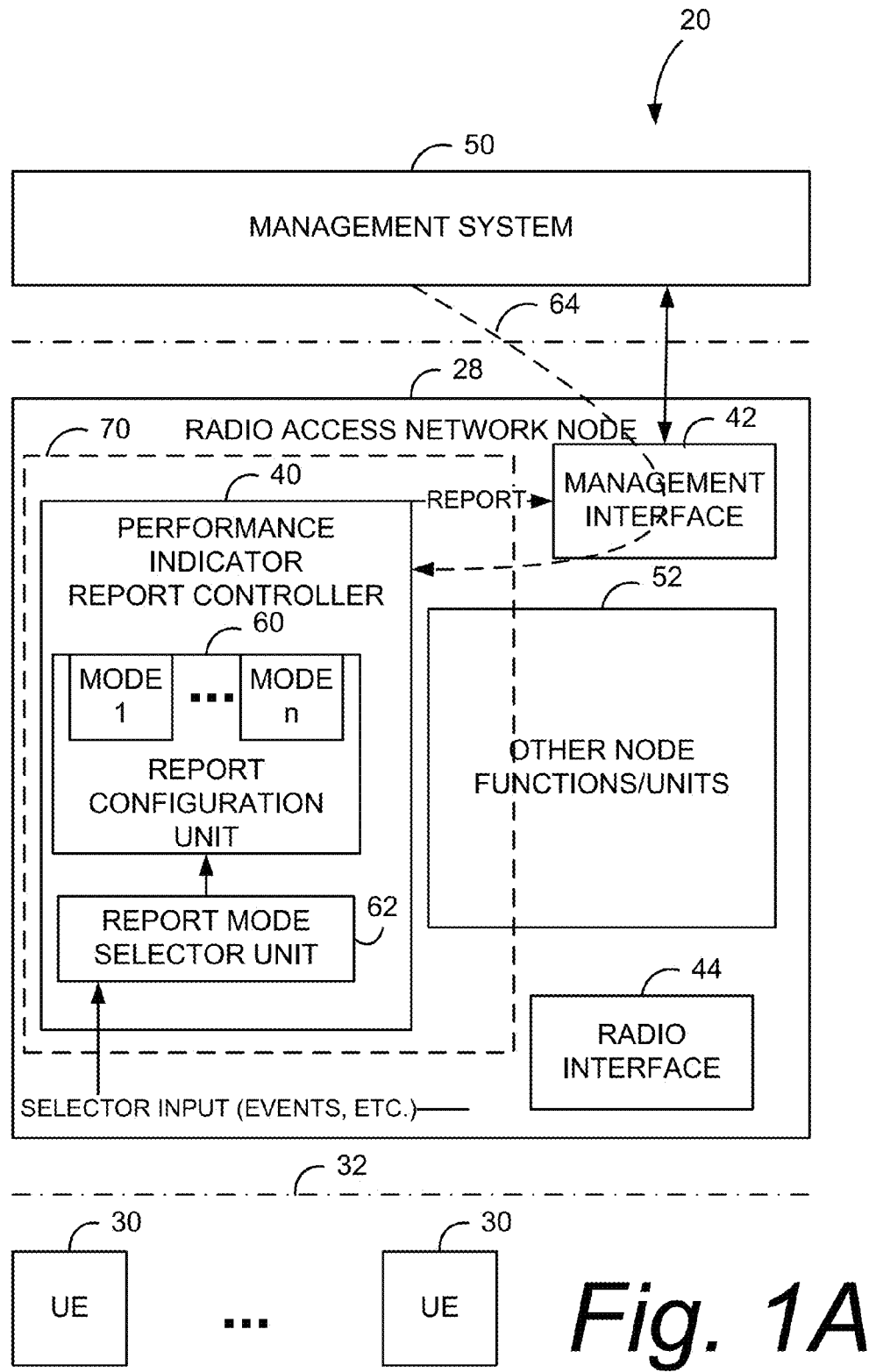
FIG. 1A is a schematic view of an example telecommunications system showing, e.g., a radio access network node which comprises a performance indicator reporting function according to an example embodiment of the technology disclosed herein.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

As used herein, "terminal" or "wireless terminal" or "user equipment (UE)" may be a mobile station such as a mobile telephone or "cellular" telephone or a laptop with wireless capability, e.g., mobile termination, and thus may be, for example, a portable, pocket, hand-held, computer-included, or car-mounted mobile device which communicates voice and/or data via a radio access network. Moreover, a terminal or wireless terminal or UE may be a fixed terminal which communicates voice and/or data via a radio access network.

The technology disclosed herein concerns apparatuses and methods to reduce the amount of performance indicator (PI) data to retrieve from a node. The PI data to be retrieved may depend on the reporting mode of the node, as well as the configured reporting scope of the current reporting mode. The set of available reporting modes may depend of the node type. Moreover, the current reporting mode may depend on the time of day, week etc, the amount of served subscribers, traffic volume, etc., over a time window, whether a specific fault has occurred, the importance of the node in the network, etc.

The node may be any node of a cellular network. As used herein, a "cellular network" may comprise a radio network, a core network, or a transport network, and thus a "cellular network node" may comprise a node of any of such networks. Nodes of a radio access network may comprise, for example, a base station node, an eNodeB, or a radio network controller (RNC) Nodes of a core network may comprise, for example, a mobile services switching center (MSC), a mobility management entity (MME), a policy and charging rules function (PCRF) or a packet data network gateway (PDN-GW). As used herein, a "transport network" means or encompasses all nodes carrying traffic between "cellular network" specific nodes. Example nodes of a transport network may comprise for example routers, switches, firewalls and security gateways.

Furthermore, the configured reporting scope may be with essentially all available PIs, but may also be a reduced set of PIs, PIs combined into key performance indicators (KPIs) at the node, aggregated PIs, only PIs related to a specific fault, event-triggered or periodic reporting of PIs. Raw PI data may still be generated in parallel for storage locally on the node or on file store equipment outside the node.

FIG. 1A illustrates an example telecommunications system 20 showing, e.g., a radio access network node 28 which communicates with one or more wireless terminals 30 across an air or radio interface 32. The radio access network node 28 comprises a performance indicator reporting function according to an example embodiment of the technology disclosed herein. The node 28 of FIG. 1A is shown as particularly comprising, as an example implementation, performance indicator report controller 40; management interface 42; and radio interface unit 44. The management interface 42 is connected to management system 50. The management system 50 is external to the radio access network node 28. The management system 50 may be within the radio access network, but is preferably centralized outside the radio network. The radio interface 44 facilitates communications by the node with wireless terminals 30 or UEs over a dashed-dotted line which represents the air or radio interface 32.

In addition, FIG. 1A also shows the radio access network node as comprising other node functionalities or units 52 which are known to the person skilled in the art, including but not limited to (at least in some embodiments) functionalities such as handover control, load control, power control, and the like.

As shown in FIG. 1A, the performance indicator report controller 40 comprises report configuration unit 60 and report mode selection unit 62. The report configuration unit 60 is illustrated as comprising or hosting plural performance indicator data reporting modes, depicted (for sake of simplicity) as mode 1 through mode n. As such, the performance indicator report controller 40 is arranged to configure the node with the plural performance indicator data reporting modes.

In some example embodiments and modes, report configuration unit 60 may itself be configured by instructions or signals from the management system 50 (received, e.g., over the management interface). The activity of management system 50 configuring report configuration unit 60 is depicted by arrow 64 in FIG. 1A. Arrow 64 is shown as a broken or dashed arrow in order to reflect its optional nature, e.g., being performed only in certain example embodiments and modes. An example signal or message that may be sent from management system 50 to radio access network node 28 in order to configure report configuration unit 60 is a setMOAttribute message. A signal or message that is sent from management system 50 to radio access network node 28 in order to configure report configuration unit 60 includes information elements such as, for example, a node identifier and an indication of a selected reporting mode.

As explained herein, the report mode selection unit 62 serves to make a selection of one of the plural modes as a current reporting mode. The performance indicator report controller 40 operates the node 28 according to the current reporting mode.

The node 28 of FIG. 1A may be any radio access network node, and typically is a base station node, for example. In Long Term Evolution (LTE) parlance the base station node is also termed an eNodeB or eNB.

Figure 1B:
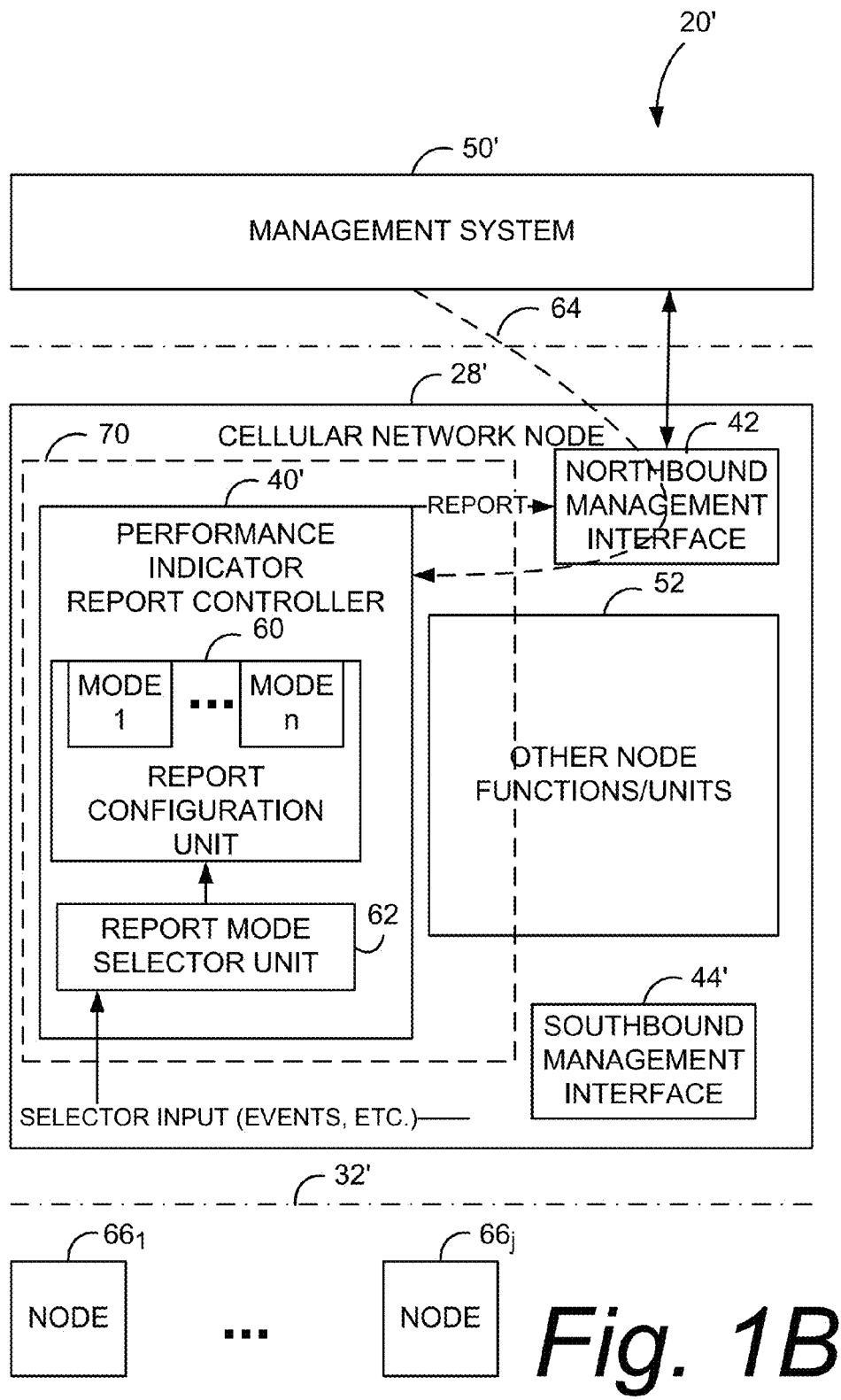
FIG. 1B is a schematic view of an example telecommunications system showing, e.g., an intermediate cellular network node which comprises a performance indicator reporting function according to an example embodiment of the technology disclosed herein.

Whereas FIG. 1A illustrates an example embodiment in which node 28 is a radio access node, FIG. 1B illustrates another embodiment telecommunications system 20' showing, e.g., a cellular network node 28'. The cellular network node 28' which communicates with one or more other cellular network nodes 66₁-66ⱼ across, among other things, a southbound management interface 32'. The cellular network node 28' comprises a performance indicator reporting function according to an example embodiment of the technology disclosed herein. The node 28' of FIG. 1B is shown as particularly comprising, as an example implementation, performance indicator report controller 40'; northbound management interface 42'; and southbound management interface unit 44'. The northbound management interface 42' is connected to management system 50'. The management system 50' is external to the cellular network node 28'. The management system 50' is preferably but not necessarily centralized outside the radio network and may comprise, e.g., a server of a core network. The southbound management interface unit 44' facilitates communications by the node with other cellular network nodes 66₁-66ⱼ over a dashed-dotted line which represents the southbound management interface 32'.

Although subsequent embodiments of a network node are primarily described with reference to a radio access network node such as node 28, it should be understood that the technology disclosed herein is not limited to a radio access network node but may be another type of node, such as the cellular network node 28'. That is, the embodiments described herein may pertain either to a radio access network node or to a cellular network node, or any other suitable node performing similar functions.

As shown in the example implementation of FIG. 2, one of the possible modes may be a default mode. In this regard, the default reporting scope may be full reporting with all defined performance indicators/counters per cell or cell relation for all service classes and signaling causes every reporting period.

Whereas one reporting mode may be the default reporting scope, at least one of the other reporting modes may have reduced reporting scope. Reduced reporting scope modes may be realized by, for example, (1) reducing the number of performance indicators (PIs); (2) aggregating the PIs over cell relation, cell or node; (3) reporting PIs less frequently; (4) considering event-triggered reporting instead of periodic reporting for each reporting period (as an example minimization of drive tests (MDT) reporting may either be configured as event-triggered or periodic).

In the above regard, FIG. 2 illustrates an example embodiment and mode in which the report configuration unit 60(2) reports not only a default mode (as mode 1), but other modes including a reduced PI report scope mode (mode n). The "reduced PI report scope mode" may encompass one or both of (1) reducing the number of PIs and (2) aggregating the PIs over cell or node.

Examples of methods (1) for reducing the PI report scope by a reduced number of PIs are (a) to report the PIs less frequently or (b) to report only the KPIs calculated based on existing PIs instead of reporting all raw PIs. Method (a) of reporting the PIs less frequently may reduce the number of PIs reported by any desired factor. For example, reporting every hour instead of every 15 min will give a reduction of a factor 4, every 24 hours instead of every 15 min, a factor 96. Method (b) [report only the KPIs calculated based on existing PIs] may reduce the number of PIs reported by a factor of 4 to 20 depending on the complexity of the KPI calculation.

An example of a method (2) for reducing the PI report scope by aggregation is to select a counter on an object or relation with many instances (e.g., the cell relation in any radio technology) and create a corresponding counter on a higher level object (e.g., cell) that includes the data from all the detailed counters. In this example plural cell relation counters pmHoPrepSuccLteIntraF (number of successful handover preparations for a particular cell relation for an intra frequency handover within an LTE radio network) may be aggregated into a counter on a cell level, e.g. pmCellHoPrepSuccLteIntraF, and such a counter may then, for each cell, store the sum of the pmHoPrepSuccLteIntraF counters for all cell relation objects originating from that cell. With a maximum number of neighbor cell relations of 256 and an average number of actually configured neighbor cell relations varying between 20 and 100, the reduction of data may also be in the order of these values.

In a third example, methods (1) and (2) may be combined to, e.g., calculate the KPI "Mobility Success Rate" on a node level (for an RBS) or logical group of cells (for an RNC or BSC) based on several counters from each cell relation object. In this combined example the KPI may be divided into two parts—success rate for intra node mobility (handover between cells within the same node or logical group) and success rate for inter node mobility (handover success rate for handovers from a cell to any of its neighbor cells outside the node or logical group of cells). As the effect of these methods is multiplicative, combining methods (1) and (2) will achieve reductions in the order of 10 to 10,000 depending on the cardinality between the aggregating object (e.g. cell or node) and the basic object (e.g. cell relation).

Figure 7:
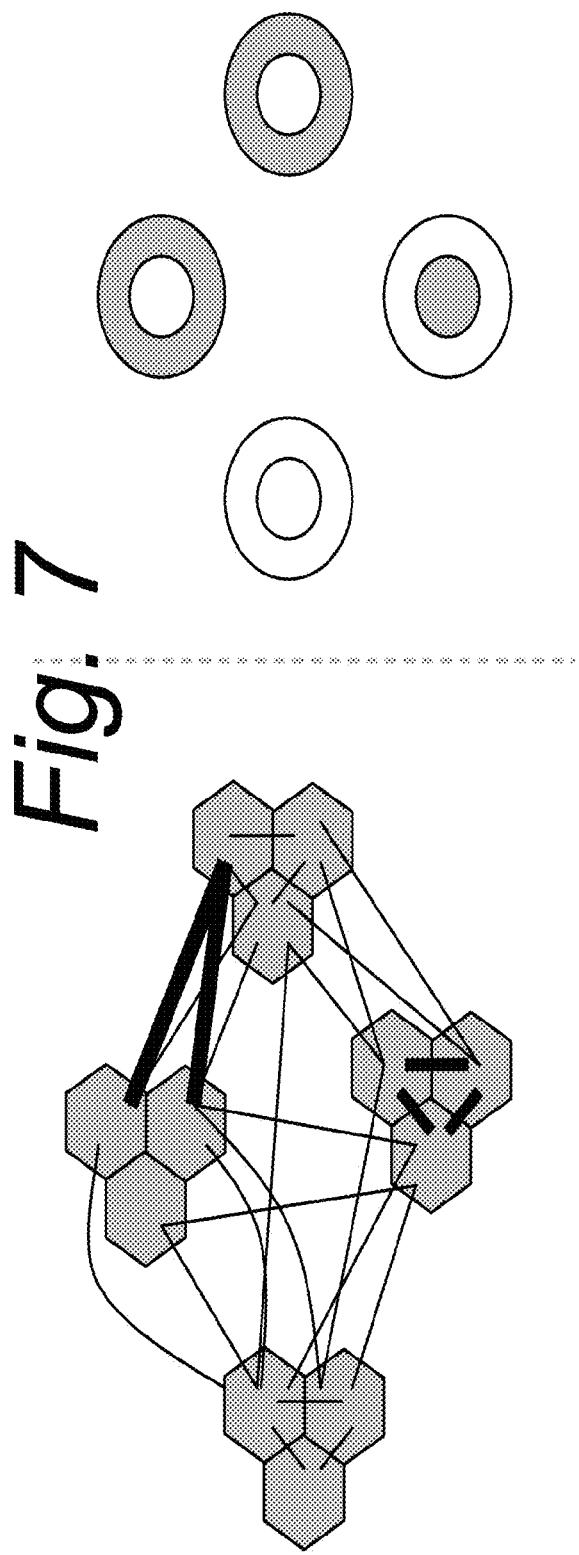
FIG. 7 is a diagrammatic view depicting an example of how node side aggregation of data may be used to reduce the data while still conveying the intended information.

In the above regard, FIG. 7 illustrates an example, simplified scenario showing the advantage of aggregation of data. The left side of FIG. 7, e.g., the portion of FIG. 7 to the left of the broken line divider, depicts a few three-cell nodes (as if displayed on a geographical map) and a limited set of neighbor relations between the cells (as shown by the connecting lines). Some of the neighbor relations have mobility key performance indicator (KPI) values that indicate a problem, such problematic neighbor relations being shown in FIG. 7 by the darker or thickened lines. The scenario of FIG. 7 is simplified since a three cell node would typically have between 50 and 200 cell relations, and in some situations many more cell relations, and as a result being barely readable. The right side of FIG. 7 depicts the same scenario as the left side of FIG. 7, but where the mobility key performance indicator (KPI) values have been aggregated into two values per node. The two aggregated values of the right side of FIG. 7 are internal mobility success rate (a KPI value for intra node handover, represented by the color in the inner circle) and external mobility success rate (the corresponding KPI for inter node handover, represented by the color in the outer circle). FIG. 7 graphically illustrates the effect of the KPI aggregation. As seen in FIG. 7, considerably fewer values are used to transmit the same information. Two of the nodes of the right side of FIG. 7 experience a poor value for relations between these nodes (upper right part, the outer circles are filled with a gray shade), and one node has poor values for one or more internal relations (bottom part, the inner circle is filled with a gray shade).

Table 1 summarizes the expected data reduction in the example depicted in FIG. 7 by showing number of normal counters (PIs) per node and the equivalent number of KPIs per node when the KPI is divided in two parts.

TABLE 1

Expected Data Reduction

| #of Cells per Node | # of Cell Relations Per Cell | # of Performance Indicators (PI) per Relation | # of Performance Indicators (PI) per Node | # of KPIs per node |
|---|---|---|---|---|
| 3 | 30 | 12 | 1080 | 2 |
| 6 | 100 | 12 | 7200 | 2 |

Although the data reduction in this particular example is in the order of 99.8% or more, the general reduction when applied to all KPIs of a node is expected to be much less, e.g. in the order of 70%-95% depending on the function and data model of the node type.

Figure 3:
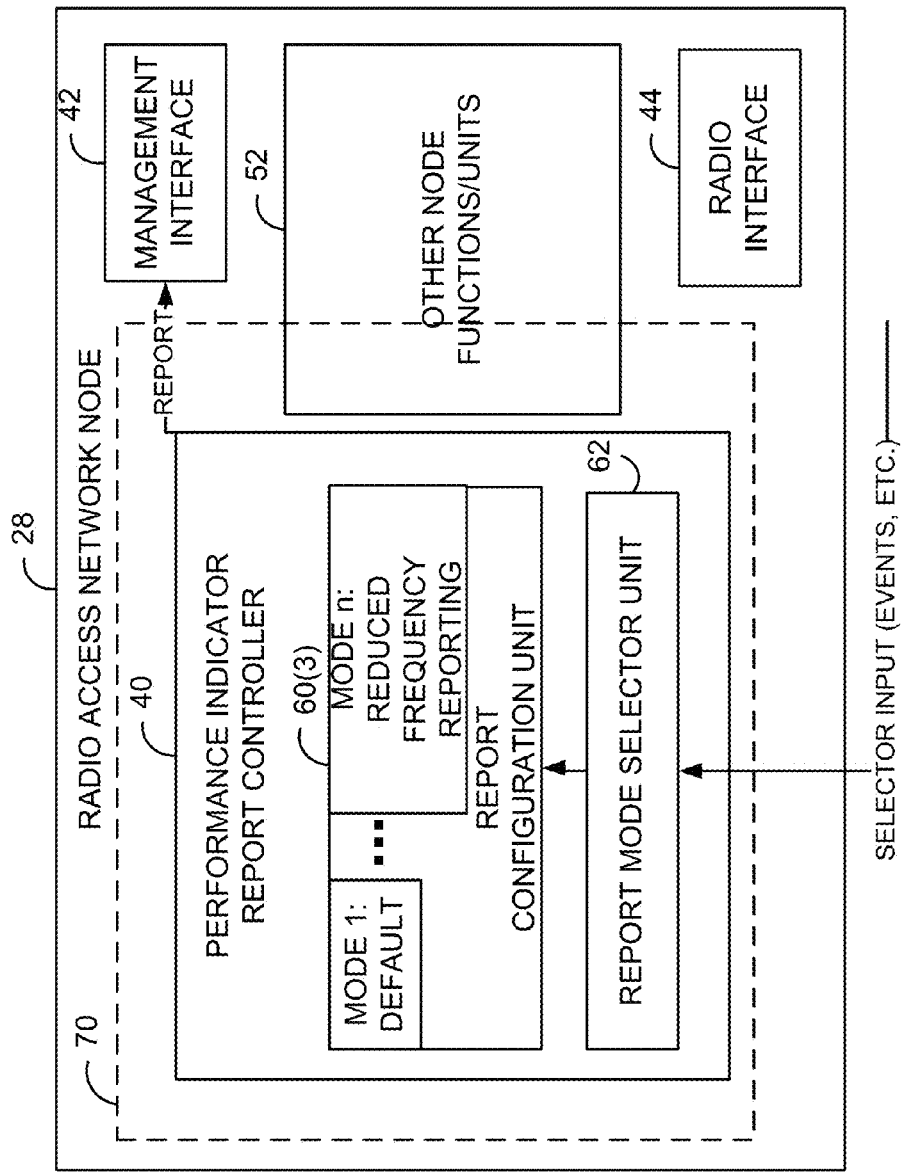

FIG. 3 illustrates an example embodiment and mode in which the report configuration unit 60(3) is configured to report not only a default mode (as mode 1), but other modes including a reduced frequency reporting mode (mode n). In an example embodiment, the example report configuration unit 60(3) is configured to report either the default mode (mode 1) or the reduced frequency reporting mode (mode n). In the default mode the frequency of the reporting is more often than in the reduced frequency reporting mode. For example, in the default mode the frequency of the reporting may occur as often as 5 minutes, whereas in the reduced frequency reporting mode the reporting may occur only every 60 minute. The frequency numbers for both the default mode and the reduced frequency reporting mode may be preconfigured or preprogrammed for the report configuration unit 60(3), or supplied to report configuration unit 60(3) by another unit or node such as management system.

Reduced reporting scope modes may also include modes which include in the reporting only PIs related to a specific procedure or fault in the radio network. An example of such a procedure would be overload protection, where one part of such a procedure would be to reduce load due to performance monitoring by switching to a less resource consuming reporting mode.

Reduced reporting scope modes may also include modes which report refined information at the node, e.g., by aggregating PIs into key performance indicators, as described above.

Thus, the embodiments of the report configuration unit described herein provide or configure the network nodes with plural reporting modes. There may be multiple reporting modes available in the management of the network nodes. A reporting mode corresponds to a reporting scope as defined above. The set of available reporting modes may depend on the node type as different node types have different functionally and thus different PIs and different KPIs, and it may therefore be of interest to have reporting modes for partly different purposes on one node type compared with another node type. As an example, extra verbose reporting modes for trouble shooting purposes may be divided in functional areas (enabling detailed PI production related to some functions of a node) and one such mode for troubleshooting routing table issues in a site router node may not be of interest to e.g. a small eNB that does not contain any routing functionality.

Figure 4:
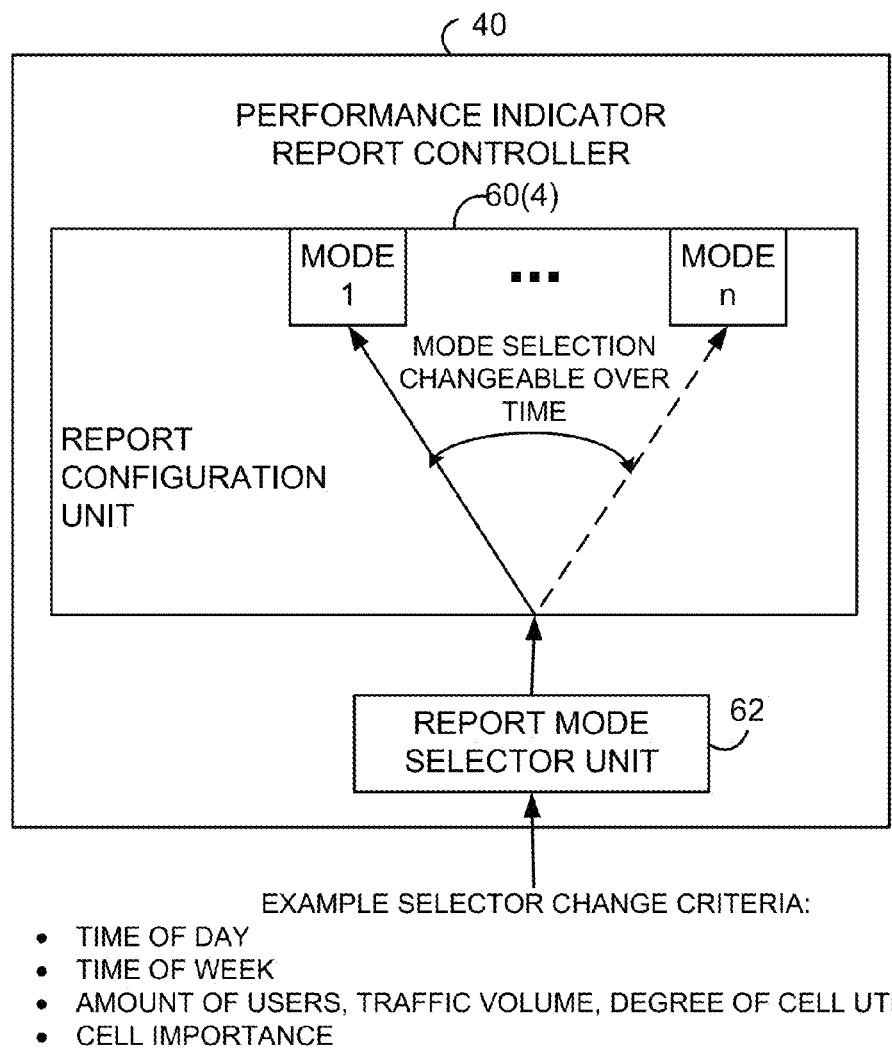

In an example embodiment such as that represented by FIG. 4, the reporting mode of the node may change over time. FIG. 4 shows that report mode selection unit 62 may, over time, change its selection of reporting mode. Such mode transitions may depend on, for example:

The time of day. For example, there is one reporting mode during office hours and another reporting mode otherwise. The office hours reporting mode may correspond to the default reporting scope with all performance indicators (PIs) every reporting period, while the non-office hours reporting mode may correspond to a reporting scope of aggregated data over the node every hour.

The time of week. Similar to the time of day, where weekends have different reporting modes compared to work days.

The amount of served users, traffic volume, or any counter indicating to what extent the node or cell is utilized. If the counter is below a threshold, then a reduced reporting scope is considered, while if above the threshold, a more comprehensive and/or frequently reported scope is considered.

The importance of the cell to the operator. For example, cells covering important customers may be more important than others, pico cells providing capacity may be seen as less important than cells providing coverage. The importance may also be associated to the traffic volume, service types, time of day, week, year, etc.

Whether a fault has occurred. For example, if no fault has occurred, a very limited reporting scope is considered, while upon a specific failure, an extended reporting scope is considered including PIs related to the fault.

In accordance with an example embodiment, the reporting mode of the node may change depending on time of day/week/month/year, or value or a function of one or more performance indicator(s), e.g., whether or not a fault has occurred.

In one example embodiment of the technology disclosed herein the KPI data to produce is specified in a structured programming language, where special constructs or naming conventions are used to:

Specify the reporting entity type, i.e., on which entity of the node the KPI value is to be reported—e.g. a value per node, per cell, or per neighbor cell relation or any other entity of interest on the node.

Specify the name of the KPI value on this entity

Specify that the computed entity is a temporary computation result to be used in several places when computing the KPI Specifying what raw PI data to use in the calculation.

In this embodiment the equations may comprise mathematical operators and functions needed for expressing the KPI and the special constructs or symbols used for referencing the PI data to use. KPI data is produced for all instances of the entity it is specified for (see Table 3):

TABLE 3

```
for( CellRelation cr : CellRelation.getAllInstances( )) {
    cr.kpi_handover_success_rate =
        cr.pi_handover_prepare_successes/
        cr.pi_handover_prepare_attempts*
```

TABLE 3-continued

```
      cr.pi_handover_execute_successes/
      cr.pi_handover_execute_attempts;
 }
 // Calculates the KPI value handover_success_rate on each instance
 // of the CellRelation object class, using existing counters
 // (performance indicators, PI) on the same class and its instances.
```

Table 3 illustrate an example of how KPI definitions in a textual format could be formulated in an example embodiment of the technology described herein. Naming conventions and language syntax similar to those found in the programming language Java may be used to express such formulas.

In another example embodiment the KPI definitions may be provided as part of a Managed Information Model (MIM) of the node, thereby utilizing a 3GPP-specified Operation and Management (O&M) interface principle for configuration management of a node. In this example embodiment, suitably defined managed object (MO) classes may be used to describe the computations needed and the KPI values generated. Thus, the mathematical formulas involved in the KPI definitions may be stored in various ways, such as a text file or similar of as object instances in the node configuration where each fragment of the equation is represented using an MO instance.

The KPI data produced using principles described above may be further aggregated to provide a more condensed view. Typically KPI values computed on individual cell relation are aggregated to cell level and may also be aggregated to node level.

Alternatively, instead of aggregating KPIs into high level KPIs, the aggregation may be over counters to cell level and/or node level counters, and then these aggregated counters may be used to produce the high level KPIs. Using Table 3 as example, each of the four counters used in the formula would be individually aggregated per cell so as to produce four new counters on cell level. The KPI Handover Success Rate will then be calculated on cell level based on these aggregated counters. Table 4 depicts this alternative.

TABLE 4

```
for( Cell c : Cell.getAllInstances( )) {
  // For each Cell object in the node...
  // ...assign aggregated counters with an initial value 0, ...
  c.pi_handover_prepare_successes = 0;
  c.pi_handover_prepare_attempts = 0;
  c.pi_handover_execute_successes = 0;
  c.pi_handover_execute_attempts = 0;
  // ...then iterate over all CellRelations from this cell to anywhere
  // else and sum up each individual counter to the corresponding
  cell level counter.
  for( CellRelation cr : c.getAllRelations( )) {
     c.pi_handover_prepare_successes +=
        cr.pi_handover_prepare_successes;
     c.pi_handover_prepare_attempts +=
        cr.pi_handover_prepare_attempts;
     c.pi_handover_execute_successes +=
        cr.pi_handover_execute_successes;
     c.pi_handover_execute_attempts +=
        cr.pi_handover_execute_attempts;
  }
  // Finally, calculate the Cell level KPI value:
  c.kpi_handover_success_rate =
     c.pi_handover_prepare_successes/
     c.pi_handover_prepare_attempts*
     c.pi_handover_execute_successes/
     c.pi_handover_execute_attempts;
}
```

TABLE 4-continued

```
// Calculates aggregated versions of CellRelation counters on cell level
// and the KPI value handover_success_rate on each instance
// of the Cell object class, using the aggregated counters.
```

In an embodiment using a structured programming language such further aggregation of counters would be specified using the same mechanism and formalism as is used to specify the KPI values.

Figures 6, 8:
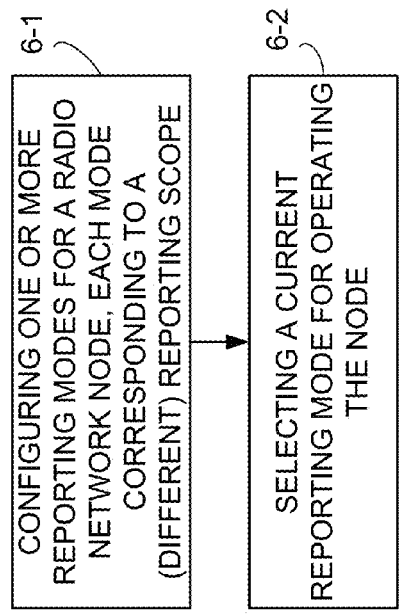
FIG. 6 is a flowchart showing basic, example, representative steps or acts performed in accordance of a mode of operation of an example mode of the technology disclosed herein.
FIG. 8 is a diagrammatic view of an example representation of aggregation or Key Performance Indicator (KPI) calculations.

In another embodiment where KPI computations are declared in the Managed Information Model (MIM) also the aggregations are declared using MIM constructs. FIG. 8 depicts a text file containing the formulas described herein, e.g., showing an example of aggregation or KPI calculations (from Table 3). A text file containing a textual representation of the aggregation and/or KPI calculation expression may be stored in the node, thereby instructing the node to also present these "counters" as available for subscription by a management system. If subscribed to, the node will compute and output these counter values as instructed in this file.

Figure 9:
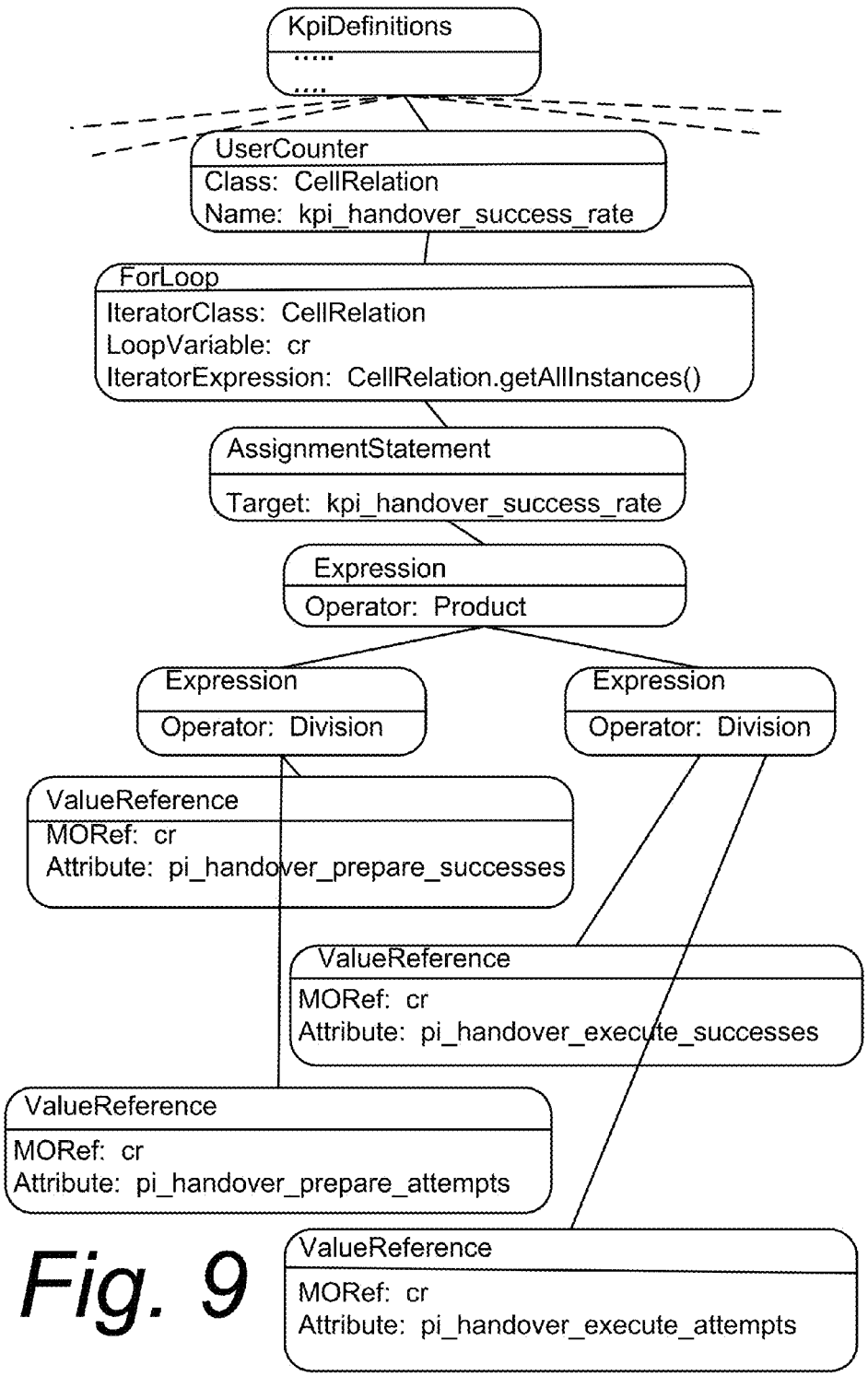
FIG. 9 is a diagrammatic view of an example way in which a first counter defined in FIG. 8 may be represented using managed object (MO) instances in an managed information model (MIM) of a node.

FIG. 9 shows an example of how the first counter defined in FIG. 8 may be represented using managed object (MO) instances in the managed information model (MIM) of a node. Defining a new counter is, in this example, done by, e.g., creating a suitable structure tree of MO instances (the boxes). Other structures and organizations of suitably defined MO instances can also be used, e.g., where the equation part is presented as a string attribute. FIG. 9 thus provides a comparison to FIG. 8 in that FIG. 9 depicts the same information as FIG. 8 but represented by data structures in the MIB (the configuration data of the node.

Figure 1C:
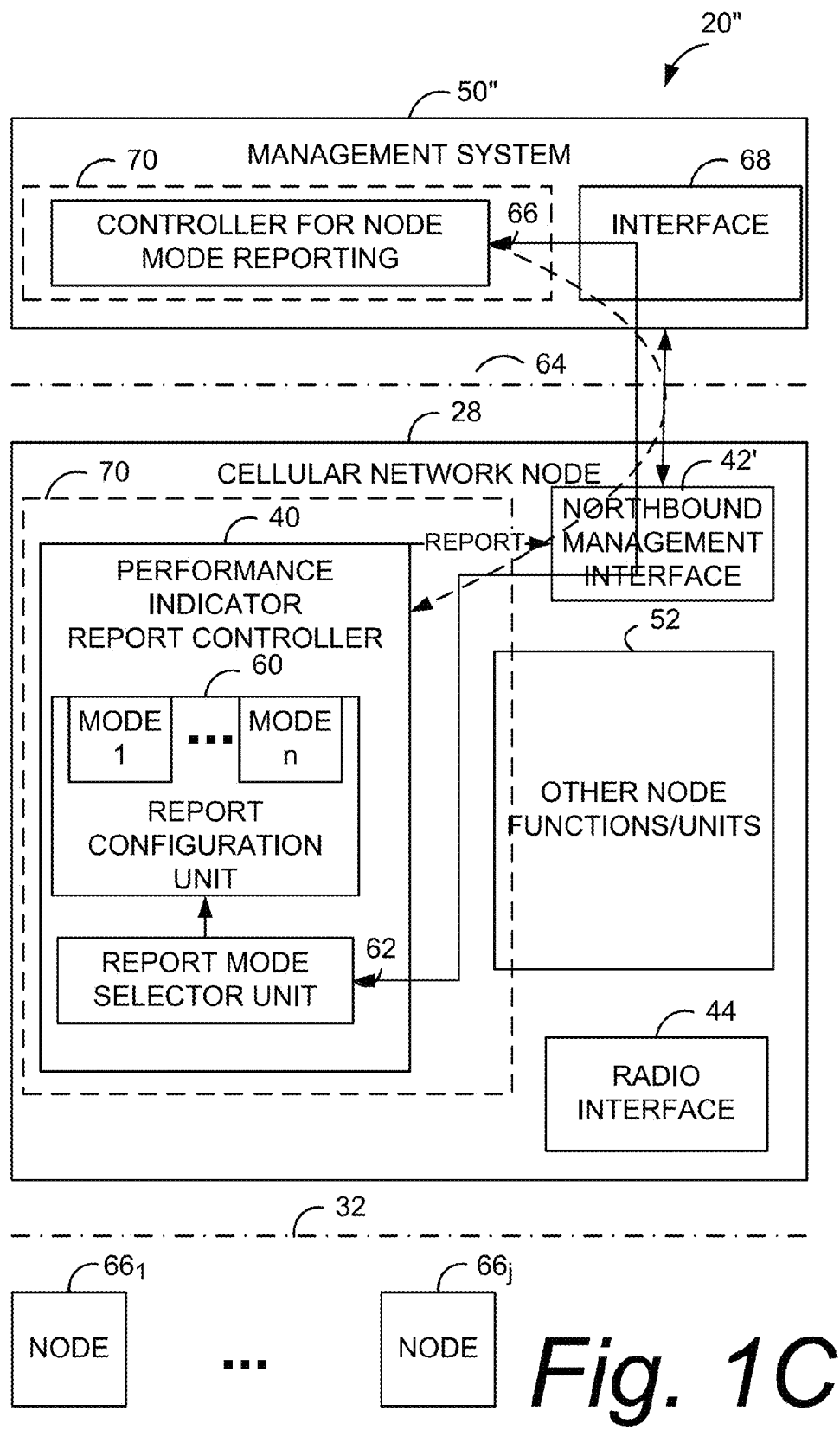
FIG. 1C is a schematic view of an example telecommunications system showing, e.g., a radio access network node which comprises a performance indicator reporting function according to an example embodiment of the technology disclosed herein, and shows more details of an example management system node.

FIG. 1C shows in more detail an example embodiment of management system node 50" for a telecommunications network 20". The management node 50" comprises controller 66 and interface 68. The controller 66, also known as the controller for node mode reporting, serves as means for configuring the node 28 with plural performance indicator data reporting modes and for configuring a selection mechanism capable of selecting one of the plural nodes as a current reporting mode. Such selection mechanism may be, in one example embodiment, the report mode selector unit 62. Communications between management system node 50" and node 28 occur through an interface 68 which comprise the management system node 50". Such communications include messages and/or signals which are input to the report mode selector unit 62 of node 28 as well as the report generated by the current mode from the network node 28. Examples of the types of information which may be supplied to report mode selector unit 62 are previously described herein, and include (for example) an importance indicator, e.g., an indicator the importance of the node 28 in the network. Although FIG. 1C resembles FIG. 1A with respect to composition of the node 28, it will be appreciated that the functionalities of the management system 50" may be utilized in conjunction with other example embodiments as well.

The broken line around elements (e.g., performance indicator report controller) in the FIG. 1A, FIG. 1B, FIG. 1C, FIG. 2-FIG. 3, and FIG. 5 depicts example platforms which may host the enclosed units or functionalities. As used herein, the terminology "platform" is a way of describing how the functional units or entities framed thereby may be implemented or realized by machine including electronic circuitry. One example platform 70 is a computer implementation wherein one or more of the framed elements are realized by one or more processors which execute coded instructions and which use non-transitory signals in order to perform the various acts described herein. In such a computer implementation the platform may comprise, in addition to a processor(s), a memory section, which in turn may comprise a random access memory; a read only memory; an application memory; and any other memory such as cache memory, for example. The memory section, e.g., the application memory, may store, e.g., coded non-transitory instructions which may be executed by the processor to perform acts described herein. Another example platform suitable for performing the acts described herein is that of a hardware circuit, e.g., an application specific integrated circuit (ASIC) wherein circuit elements are structured and operated to perform the various acts described herein.

Figure 5:
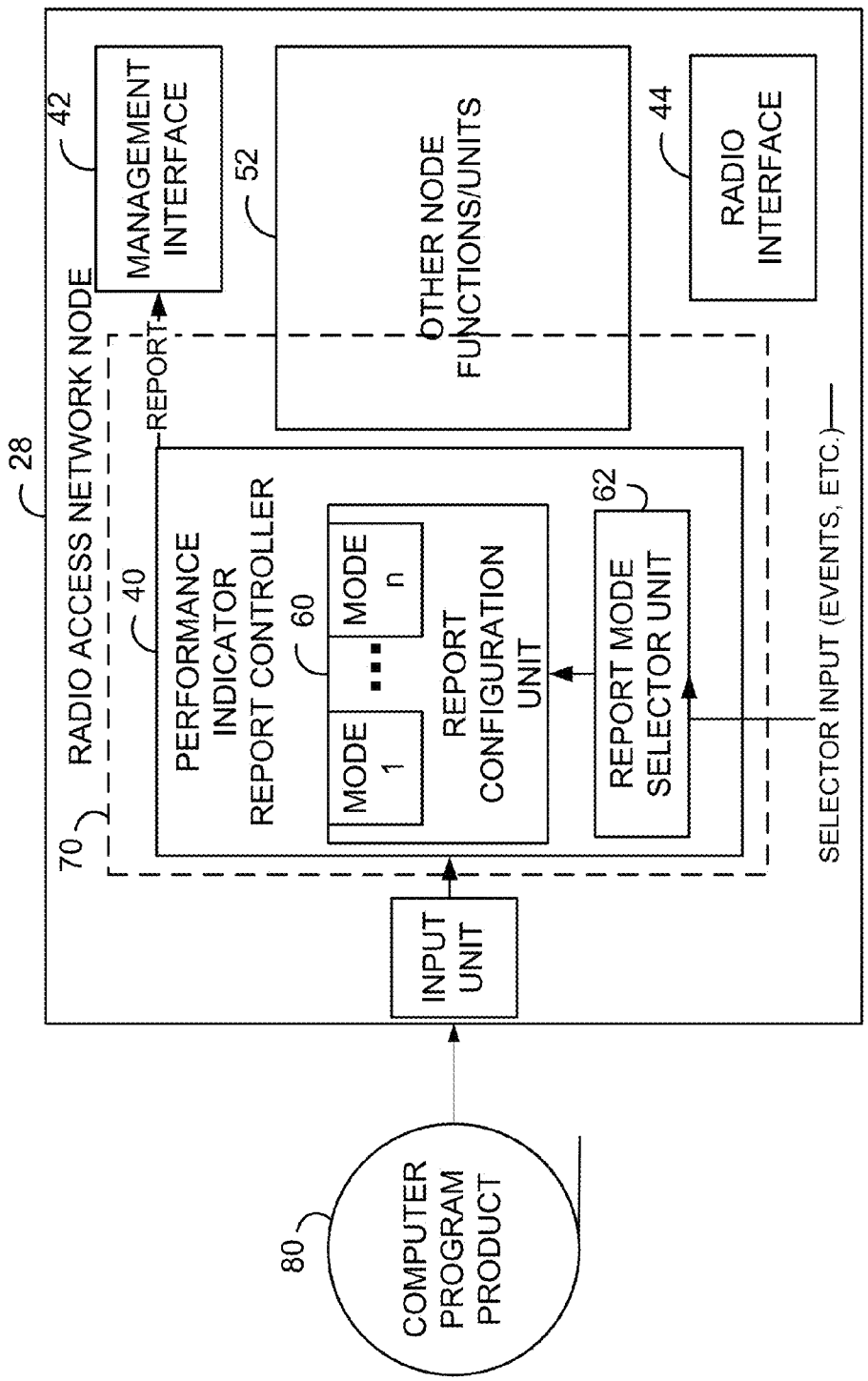

FIG. 5 particularly illustrates the use of a computer program product 80 to configure the performance indicator report controller of the node. The computer program product 80 comprises coded instructions stored on non-transient medium, such as a disk, CD, or other memory device. When executed on a processor such as that of the aforementioned platform comprising the performance indicator report controller, the computer program product 80 executes acts such as those illustrated in FIG. 6. Act 6-1 of FIG. 6 comprises configuring the node with the plural performance indicator data reporting modes; act 6-2 comprises making a selection of one of the plural nodes as a current reporting mode for the node. In other words, the computer program product (80), executed by a processor (70), serves to configure the node with plural performance indicator data reporting modes, and further make a selection of one of the plural nodes as a current reporting mode for the node. In addition, the instructions of the computer program product 80 may be configured or arranged to accomplish any of the other acts, modes, or implementations described herein.

A common advantage for example embodiments is the possibility to provide customer/node type/temporal/context-aware specific observability that provide necessary information with respect to the situation, without reducing the level of detail when needed. Also, the technology disclosed herein provides value enhancement of the data on the node while reducing the amount of data to be sent to a central management station. By enhancing the value of the data and at the same time reduce the volume of the data significantly the management becomes more efficient.

The technology disclosed herein thus comprises and encompasses various example embodiments including but not limited to the following:

Example Embodiment N1

A node of a telecommunications system comprising electronic circuitry arranged to configure the node with plural performance indicator data reporting modes and to make a selection of one of the plural modes as a current reporting mode and configured to operate the node according to the current reporting mode.

Example Embodiment N2

The node according to Example Embodiment N1, wherein the electronic circuitry is arranged to configure the node with a set of plural performance indicator data reporting modes and to construct the set of modes in dependence upon a type of the node.

Example Embodiment N3

The node according to Example Embodiment N1, further comprising an interface configured to transmit a report generated by the current mode to a management system, the management system being external to the node.

Example Embodiment NM1

A node of a telecommunications system comprising means for configuring the node with plural performance indicator data reporting modes and for making a selection of one of the plural nodes as a current reporting mode and operating the node according to the current reporting mode.

Example Embodiment CPP1

A computer program product comprising coded instructions stored on non-transient media which, when executed by a processor, configure a node of a communications system with plural performance indicator data reporting modes and make a selection of one of the plural nodes as a current reporting mode for the node.

Example Embodiment CPP2

The computer program product of Example Embodiment CPP1, wherein in differing implementations the coded instructions comprise performance of acts described in any one of Example Embodiments M1-M10.

Example Embodiment M1

A method of operating a node of a telecommunications system comprising:
  configuring the node with plural performance indicator data reporting modes;
  making a selection of one of the plural nodes as a current reporting mode and operating the node according to the current reporting mode.

Example Embodiment M2

A method according to Example Embodiment M1, further comprising:
  configuring the node with a set of plural performance indicator data reporting modes;
  constructing the set of modes in dependence upon a type of the node.

Example Embodiment M3

A method according to Example Embodiment M1, where the selection of reporting mode is made dependent on at least one of the following:
  calendar date and/or calendar time;
  number of subscribers or wireless terminals served by the node;
  importance of subscribers covered by a cell;
  traffic volume experienced by the node;
  occurrence of a specific fault at the node.

Example Embodiment M4

A method according to Example Embodiment M1, wherein performance of at least one of the modes comprises reporting of a reduced set of performance indicators, the reduced set of performance indicators comprising fewer performance indicators than a greater amount of performance indicators of another mode.

Example Embodiment M5

A method according to Example Embodiment M4, further comprising storing, either at the node or externally to the node, the greater amount of performance indicators of the another mode even when the at last one of the modes is the current reporting mode.

Example Embodiment M6

A method according to Example Embodiment M1, wherein performance of at least one of the modes comprises performance indicators at a different reporting frequency than another mode.

Example Embodiment M7

A method according to Example Embodiment M1, wherein performance of the at least one of the modes comprises combining a plurality of performance indicators into a key performance indicator at the node and reporting the key performance indicator in lieu of the plurality of performance indicators.

Example Embodiment M8

A method according to Example Embodiment M1, wherein performance of the at least one of the modes comprises reporting selected performance indicators only related to a specific event, and wherein the specific event comprises at least one of a specific fault detected at the node, an event triggered at the node, an event related to a specific procedure performed at the node, or a specific periodic triggering event.

Example Embodiment M9

A method according to Example Embodiment M1, wherein at least one of the modes defines one or more performance indicators to be reported per cell or per cell relation.

Example Embodiment M10

A method according to Example Embodiment M1, wherein the plural of modes comprises a default mode, and wherein the default mode is configured to report all performance indicators per cell or cell relation for all service classes and signaling causes every reporting period.

Example Embodiment M11

A method of operating a telecommunications system comprising:
configuring a node of the communications system with plural performance indicator data reporting modes;
making a selection of one of the plural nodes as a current reporting mode and operating the node according to the current reporting mode.

Example Embodiment M12

A method according to Example Embodiment M11, further comprising:
configuring the node with a set of plural performance indicator data reporting modes;
constructing the set of modes in dependence upon a type of the node.

Example Embodiment M13

A method according to Example Embodiment M11, further comprising: using a management system to at least partially configure the node of the communications system with the plural performance indicator data reporting modes.

In networks, the nodes may be a producer of statistics (generating the raw data), a reporter of statistics (to the OaM system), and/or a reducer of statistics (by using the methods in the technology disclosed herein). The description above focuses on the by 3GPP specified E-UTRAN, also called Long Term Evolution (LTE), system where eNBs are the producer of statistics as well as the reporter of the statistics, which means that the eNB is the reducer of statistics. In other architectures, there may be one node that is the producer of statistics, and this statistics is transmitted to another node which acts as reducer of statistics and then also reporter of statistics. Examples are the radio network controller (RNC) in the 3GPP specified UTRAN system, or the base station controller (BSC) in the 3GPP specified GERAN system, which both produce statistics concerning mobiles served by its controlled base stations as well as receives statistics produced by base stations. The radio network controller may reduce the statistics by using the methods of the technology disclosed herein and report the reduced statistics to the OaM system. Moreover, a macro eNB may receive statistics produced by pico eNBs or relay nodes in its coverage area and reduce the scope of the statistics before reporting it to the OaM system.

Although the description above contains many specificities, these should not be construed as limiting the scope of the technology disclosed herein but as merely providing illustrations of some of the presently preferred embodiments. It will be appreciated that the scope hereof fully encompasses other embodiments which may become obvious to those skilled in the art, and that the scope is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved for it to be encompassed hereby.

What is claimed is:

1. A network node characterized by means for configuring the node with plural performance indicator data reporting modes and for making a selection of one of the plural modes as a current reporting mode and for operating the node according to the current reporting mode and configured to transmit a report generated by the current mode to a management system, the management system being external to the node.

2. The node according to claim 1, wherein the configuring means comprises electronic circuitry is arranged to configure the node with a set of plural performance indicator data reporting modes and to construct the set of modes in dependence upon a type of the node.

3. The node according to claim 1, wherein the interlace further is configured to receive an importance indicator from the management system, and wherein the importance indicator is used by the node for making a selection of one of the plural modes as a current reporting mode.

4. The node according to claim 1, wherein the node is a radio access network node of a telecommunications system.

5. The node according to claim 1, wherein the node is a cellular network node of a telecommunications system.

6. A method of operating a network node characterized by:
configuring the node with plural performance indicator data reporting modes;
making a selection of one of the plural modes as a current reporting mode and operating the node according to the current reporting mode;
transmitting a report generated by the current mode to a management system, the management system being external to the node.

7. The method according to claim 6, further comprising:
configuring the node with a set of plural performance indicator data reporting modes;
constructing the set of modes in dependence upon a type of the node.

8. The method according to claim 6, where the selection of reporting mode is made dependent on at least one of the following:
calendar date and/or calendar time;
number of subscribers or wireless terminals served by the node;
importance of subscribers covered by a cell;
traffic volume experienced by the node; and
occurrence of a specific fault at the node.

9. The method according to claim 6, wherein performance of at least one of the modes comprises reporting of a reduced set of performance indicators, the reduced set of performance indicators comprising fewer performance indicators than a greater amount of performance indicators of another mode.

10. The method according to claim 9, further comprising storing, either at the node or externally to the node, the greater amount of performance indicators of the another mode even when the at last one of the modes is the current reporting mode.

11. The method according to claim 6, wherein performance of at least one of the modes comprises reporting performance indicators at a different reporting frequency than another mode.

12. The method according to claim 6, wherein performance of the at least one of the modes comprises combining a plurality of performance indicators into a key performance indicator at the node and reporting the key performance indicator in lieu of the plurality of performance indicators.

13. The method according to claim 6, wherein performance of the at least one of the modes comprises reporting selected performance indicators only related to a specific event, and wherein the specific event comprises at least one of a specific fault detected at the node, an event triggered at the node, an event related to a specific procedure performed at the node, or a specific periodic triggering event.

14. The method according to claim 6, wherein at least one of the modes defines one or more performance indicators to be reported per cell or per cell relation.

15. The method according to claim 6, wherein the plural of modes comprises a default mode, and wherein the default mode is configured to report all performance indicators per cell or cell relation for all service classes and signaling causes every reporting period.

16. The method according to claim 6, wherein the node is a radio access network node of a telecommunications system.

17. The method according to claim 6, wherein the node is a cellular network node of a telecommunications system.

18. A method of operating a telecommunications system comprising:
configuring a node of the communications system with plural performance indicator data reporting modes;
making a selection of one of the plural modes as a current reporting mode and operating the node according to the current reporting mode;
transmitting a report generated by the current mode to a management system, the management system being external to the node.

19. The method according to claim 18, further comprising configuring the node with a set of plural performance indicator data reporting modes;
constructing the set of modes in dependence upon a type of the node.

20. The method according to claim 18, further comprising:
using a management system to at least partially configure the node of the communications system with the plural performance indicator data reporting modes.

21. A computer program product comprising coded instructions stored on non-transient media which, when executed by a processor, configure a node of a communications system with plural performance indicator data reporting modes and make a selection of one of the plural modes as a current reporting mode for the node and transmit a report generated by the current mode to a management system, the management system being external to the node.

22. A management system node for a telecommunications network, the management node being characterized by a controller arranged to configure the node with plural performance indicator data reporting modes and for configuring a selection mechanism capable of selecting one of the plural modes as a current reporting mode and transmit a report generated by the current mode to a management system, the management system being external to the node.

23. The management system node according to claim 22, wherein the interface further is configured to transmit an importance indicator to the network node.

* * * * *